US00RE35253E

United States Patent [19]

Worley et al.

[11] E Patent Number: Re. 35,253

[45] Reissued Date of Patent: May 28, 1996

[54] HOSE CONSTRUCTION AND METHOD OF MAKING THE SAME WITH ADHESIVELY BONDED CLAMP

[75] Inventors: Joe C. Worley, Canton; Dale K. Parker, Waynesville, both of N.C.; Manuel Campo, Monroe, La.; Jerry W. Camden, Madison Heights, Va.

[73] Assignee: Dayco Products, Inc., Dayton, Ohio

[21] Appl. No.: 291,796

[22] Filed: Aug. 16, 1994

Related U.S. Patent Documents

Reissue of:

[64] Patent No.: 5,145,218
Issued: Sep. 8, 1992
Appl. No.: 529,986
Filed: May 30, 1990

[51] Int. Cl.[6] ..... F16L 21/06

[52] U.S. Cl. ..... 285/243; 285/236; 285/252; 285/915; 285/921; 138/109; 24/19

[58] Field of Search ..... 285/236, 252, 285/253, 915, 921, 243; 24/20 R, 20 CW, 20 EE, 19, 304, 283, 279, 270; 138/109; 29/DIG. 1

[56] References Cited

U.S. PATENT DOCUMENTS

| | | | |
|---|---|---|---|
| 2,430,081 | 11/1947 | Roberts et al. | 29/DIG. 1 |
| 3,365,218 | 1/1968 | Denyes | 285/253 |
| 3,729,027 | 4/1973 | Bare | 138/109 |
| 3,756,631 | 9/1973 | Ross et al. | 285/236 |
| 4,221,407 | 9/1980 | Steimle | 285/236 |
| 4,425,682 | 1/1984 | Hashimoto et al. | 24/205 |
| 4,453,289 | 6/1984 | Kleykamp et al. | 285/236 |
| 4,538,839 | 9/1985 | Leogerwood | 285/236 |
| 4,576,664 | 3/1986 | Delahunty | 24/DIG. 11 |
| 4,643,465 | 2/1987 | Green et al. | 285/369 |
| 4,763,695 | 8/1988 | Dooley | 285/236 |
| 4,773,129 | 9/1988 | Muhr | 24/20 R |
| 4,858,279 | 8/1989 | Kato et al. | 24/20 EE |
| 5,002,094 | 3/1991 | Brovont | 285/252 |
| 5,185,913 | 2/1993 | Campo et al. | 285/915 |
| 5,297,821 | 3/1994 | Campo et al. | 285/915 |

FOREIGN PATENT DOCUMENTS 3543717 6/1987 Germany .

OTHER PUBLICATIONS

"Rubber and Plastics News", Feb. 1991, Copolymer Co. Advertisement.

*Primary Examiner*—Eric K. Nicholson
*Attorney, Agent, or Firm*—Joseph V. Tassone

[57] ABSTRACT

A hose construction and method of making the same are provided, the hose construction comprising a tubular flexible hose having opposite ends, fastening structure, and a clamp fastened to one of the ends of the hose with the fastening structure for substantially circumferentially and radially inwardly clamping the one end onto a member that has been inserted into the one end, the clamp having end projections for being toggled together to circumferentially enlarge the clamp and hold the clamp out of its clamping condition and for being released from each other so as to be circumferentially moved apart from each other as the clamp circumferentially shrinks into its clamping condition by the natural spring force of the clamp, the fastening structure comprising a single spot of adhesive disposed between and against the clamp and the hose at a point on the hose that is located substantially diametrically opposite the point on the hose where the end projections of the clamp are adapted to be toggled together.

5 Claims, 2 Drawing Sheets

HOSE CONSTRUCTION AND METHOD OF MAKING THE SAME WITH ADHESIVELY BONDED CLAMP

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a new hose construction and to a new method of making the hose construction.

2. Prior Art Statement

It is known to provide a hose construction comprising a tubular flexible hose having opposite ends, fastening means, and a clamping means fastened to one of the ends of the hose with the fastening means for substantially circumferentially and radially inwardly clamping the one end onto a member that has been inserted into the one end, the clamping means having end projections for being toggled together to circumferentially enlarge the clamping means and hold the clamping means out of its clamping condition and for being released from each other so as to be circumferentially moved apart from each other as the clamping means circumferentially shrinks into its clamping condition by the natural spring force of the clamping means, the fastening means comprising one or more staples that staples the clamping means to the hose.

Such prior known clamping means is set forth in the Muhr U.S. Pat. No. 4,773,129. Also, see the Hashimoto et al U.S. Pat. No. 4,425,692 for a similar clamping means.

It is also known to secure another type of clamping means to an end of a hose by gluing. For example, see the Kleykamp et al U.S. Pat. No. 4,453,289.

Also, see the Bare U.S. Pat. No. 3,729,027 and the Denyes U.S. Pat. No. 3,365,218 for other means for securing clamping means in desired positions at an end of a hose that is to be subsequently clamped onto a member inserted into that end of the hose.

SUMMARY OF THE INVENTION

It is one of the features of this invention to provide a new hose construction having unique means for securing a toggle clamping means to an end of the flexible hose thereof so that the toggle clamping means can be utilized at any desired time to readily clamp that end of the hose onto a member inserted into that end of the hose.

In particular, it has been found according to the teachings of this invention that a conventional toggle clamping means that is stapled to the end of a flexible hose creates various problems.

For example, it was found that the toggle clamp will deform during the stapling operation when the stapler contacts the clamp and stapling sometimes causes a defective hose due to misstapling. Also, it was found that the toggle clamping means does not seal well when stapled on because the band thereof must work as one unit in contrast to a wire clamp which will seal with the inside wire independent of the outer wire thereof.

Therefore, it was found according to the teachings of this invention that in order to overcome the limitations of stapling the toggle clamping means to an end of a flexible hose, the toggle clamping means can be directly glued to the hose by a single spot of adhesive means disposed between and against the clamping means and the hose at a point on the hose that is located substantially diametrically opposite the point on the hose where the end projections of the clamping means are adapted to be toggled together, such single spot of glue having the particular advantage that the clamping means will not deform the hose as would be provided by two spots of adhesive means.

For example, one embodiment of this invention comprises a hose construction comprising a tubular flexible hose having opposite ends, fastening means, and a clamping means fastened to one of the ends of the hose with the fastening means for substantially circumferentially and radially inwardly clamping the one end onto a member that has been inserted into the one end, the clamping means having end projections for being toggled together to circumferentially enlarge the clamping means and hold the clamping means out of its clamping condition and for being released from each other so as to be circumferentially moved apart from each other as the clamping means circumferentially shrinks into its clamping condition by the natural spring force of the clamping means, the fastening means comprising a single spot of adhesive means disposed between and against the clamping means at a point on the hose that is located substantially diametrically opposite the point on the hose where the end projections of the clamping means are adapted to be toggled together.

Accordingly, it is an object of this invention to provide a new hose construction having one or more of the novel features of this invention as set forth above or hereinafter shown or described.

Another object of this invention is to provide a new method of making such a hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
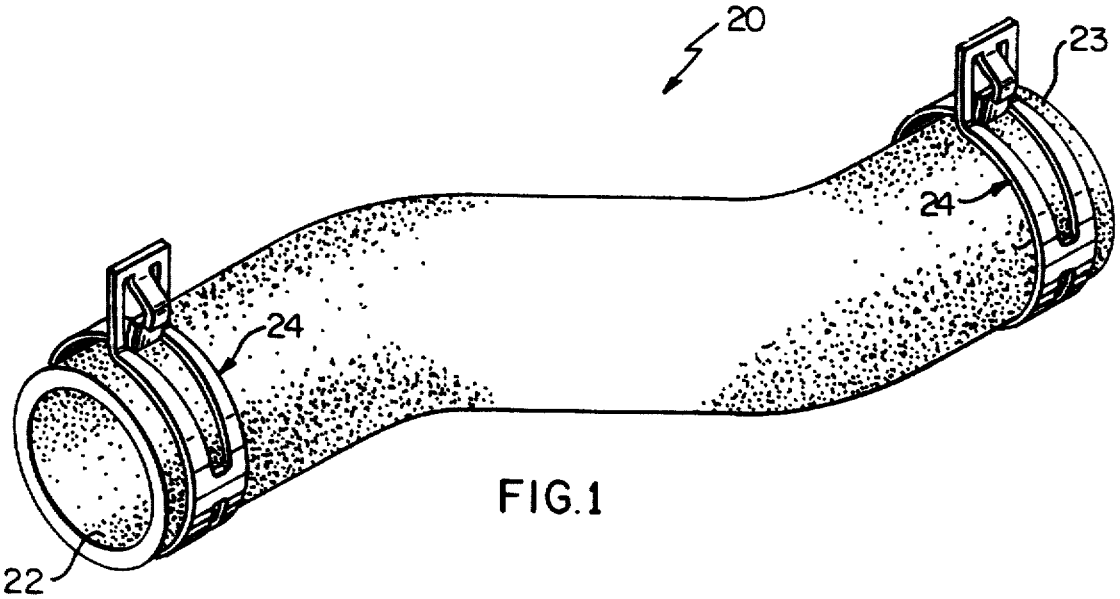
FIG. 1 is a perspective view of the new hose construction of this invention.

While the various features of this invention are hereinafter illustrated and described as being particularly adapted to provide a hose construction for a vehicle coolant system, it is to be understood that the various features of this invention can be utilized singly or in various combinations thereof to provide a hose construction for other structures as desired.

Therefore, this invention is not to be limited to only the embodiments illustrated in the drawings, because the drawings are merely utilized to illustrated one of the wide variety of uses of this invention.

Referring now to FIG. 1, the new hose construction of this invention is generally indicated by the reference numeral 20 and comprises a tubular flexible hose 21 having opposite ends 22 and 23, the hose 21 being formed mainly of a suitable polymeric material that is adapted to be utilized as a conduit means in the coolant system of an internal combustion engine for a transportation vehicle or the like. If desired, the flexible tubular hose 21 can be cured in a manner well known in the art so as to have a particular prebent shape so as to be compatible with its positioning in the aforementioned coolant system. For example, see the aforementioned Bare U.S. Pat. No. 3,729,027 whereby this U.S. patent is being incorporated into this disclosure by this reference thereto.

The hose construction 20 also comprises one or more clamping means, each clamping means being generally indicated by the reference numeral 24 with the embodiment of the hose construction 20 illustrated in FIG. 1 having two clamping means 24 respectively being carried adjacent the opposite ends 22 and 23 of the flexible hose 21 for clamping the ends 22 and 23 onto suitable fluid conveying members or horns respectively telescopically disposed within the ends 22 and 23 in a manner hereinafter set forth.

However, it is to be understood that the hose construction 20 of this invention could be provided with just one clamping means 24 whereby only the end 22 of the hose construction 20 is illustrated in FIGS. 2–5. Nevertheless, a clamping means 24 can be utilized with the end 23 of the flexible hose 21 in a like manner, if desired.

Figure 3:
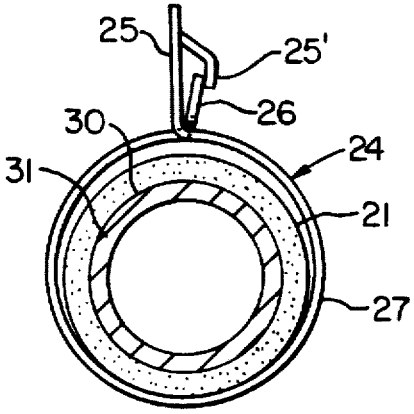
FIG. 3 is a cross-sectional view taken on line 3—3 of FIG. 2.
Figure 5:
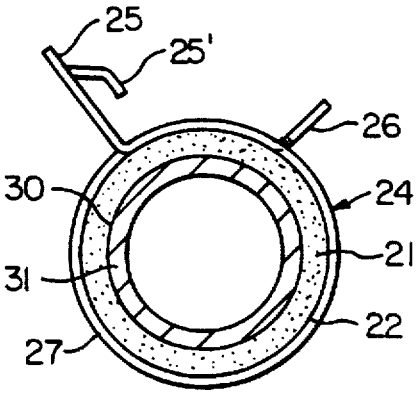
FIG. 5 is a cross-sectional view taken on line 5—5 of FIG. 4.
Figure 6:
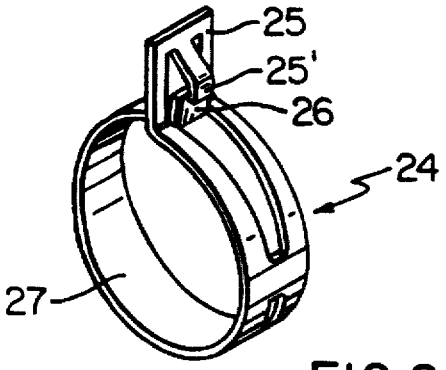
FIG. 6 is a perspective view of the clamping means of the hose construction of FIG. 1, FIG. 6 illustrating the clamping means in its toggled open condition.
Figure 7:
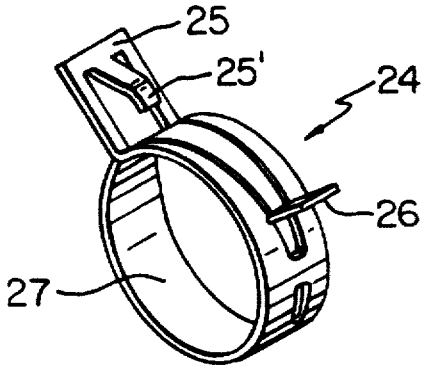
FIG. 7 is a view similar to FIG. 6 and illustrates the clamping means in its clamping condition.

The clamping means 24 is formed of any suitable metallic material that has a natural spring force to tend to circumferentially move apart a pair of end portions 25 and 26 thereof so as to shrink the defining circumference of an annular band 27 thereof from the relatively large circumference defined thereby when the ends 25 and 26 are toggled together in the manner illustrated in FIGS. 3 and 6 to the smaller circumferential configuration illustrated in FIGS. 5 and 7 when the end projections 25 and 26 are released from each other so that the clamping means 24 will move to its clamping condition in a manner well known in the art. For example, see the aforementioned Muhr U.S. Pat. No. 4,773,129 and the aforementioned Hashimoto et al U.S. Pat. No. 4,425,682, whereby these two U.S. patents are being incorporated into this disclosure by this reference thereto.

Figure 8:
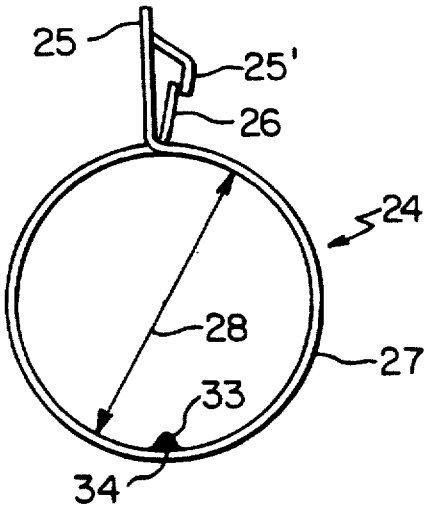
FIG. 8 is an end view of the clamping means in its toggled open condition and having a spot of adhesive means placed thereon at a point diametrically opposite the point where the projecting ends of the clamping members are toggled together.

Therefore, it can be seen that the upstanding end 26 of the clamping means 24 can be toggled under a tongue 25' of the upstanding end 25 of the clamping means 27 in the manner illustrated in FIGS. 3, 6 and 8 so as to hold the ends 25 and 26 in the clamp-open condition thereof so that the diameter 28, FIG. 8, being defined by the band means 27 of the open clamping means 24 is larger than the outside diameter 29 of the end 22 of the hose 21 so as to permit the end 22 of the hose 21 to be telescoped within the held open clamping means 24 in the manner illustrated in FIG. 8 for purposes hereinafter set forth.

Figure 4:
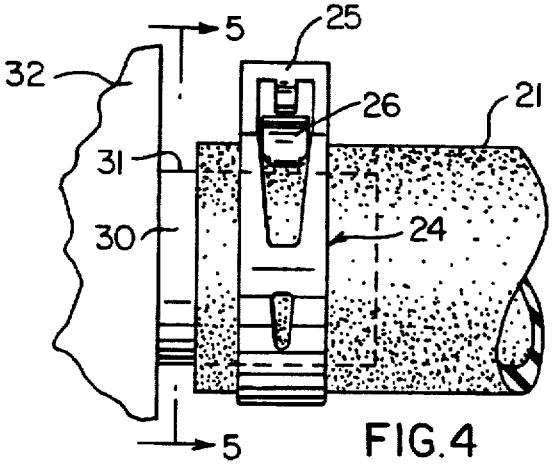
FIG. 4 is a view similar to FIG. 2 and illustrates the clamping means of the hose construction of FIG. 2 in its clamping condition.

However, when the ends 25 and 26 of the clamping means 24 are untoggled from each other by forcing the end 26 out from under the tang 25' of the end 25, the natural spring force of the clamping means 24 circumferentially spreads apart the end projections 25 and 26 thereof in the manner illustrated in FIG. 7 so as to shrink the resulting diameter of the band means 27 so that the clamping means 24, which is disposed about the end 22 of the flexible hose 21, is adapted to cause the end 22 to be radially inwardly compressed onto the external peripheral surface 30 of a tubular member 31 in the manner illustrated in FIGS. 4 and 5 so as to be sealed thereto and thereby provide a fluid path for the coolant flow of a coolant structure 32 of an internal combustion engine for a purpose well known in the art. For example, see the aforementioned Bare U.S. Pat. No. 3,729,027 and the aforementioned Denyes U.S. Pat. No. 3,365,218 whereby the Denyes U.S. Pat. No. 3,365,218 is also being incorporated into this disclosure by this reference thereto.

As previously stated, one feature of this invention is to uniquely fasten the clamping means 24 to the end 22 of the hose 21 so that the clamping means 24 will be carried by the hose construction 20 in the proper location thereon to be utilized for fastening the end 22 to the desired structure when needed.

In particular, it was found according to the teachings of this invention that the clamping means 24 can be adhesively secured to the end 22 of the hose 21 by utilizing a single spot 33 of any suitable adhesive means 34 in such a manner that the same will not adversely affect the opening and closing of the clamping means 24 during the use of the hose construction 20 for its intended purpose.

For example, it was further found according to the teachings of this invention that the spot 33 of adhesive means 34 can be disposed on the band means 27 so as to be subsequently at a point 35 on the hose 21 that is disposed substantially diametrically opposite a point 36 on the hose 21 where the projecting ends 25 and 26 of the clamping means 24 will be toggled together in the manner illustrated in FIG. 9. Of course, it is to be understood that the spot 33 of adhesive means 34 could be initially disposed on the hose 21 at the point 35 if desired.

Figure 9:
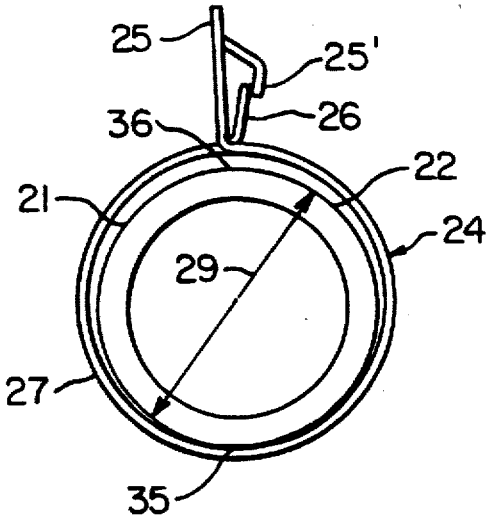
FIG. 9 is a view similar to FIG. 8 and illustrates the hose end inserted into the toggled open clamping means of FIG. 8 and being pressed against the adhesive means thereof whereby the adhesive means secures the clamping means to the hose end.

In any event, once the spot 33 of adhesive means has been disposed on the clamping means 24 or the hose 21, relative movement is created between the clamping means 24 and the hose 21 so that the hose 21 is, in effect, telescopically disposed within the open clamping means 24 in the manner illustrated in FIG. 9 and then a transverse force is applied between the hose 21 and the clamping means 24 so as to compress the spot 33 of adhesive means 34 therebetween with such force being continuously applied until the adhesive means 34 completely sets and thereby secures the clamping means 24 to the hose 21.

In one working embodiment of the hose construction 20 of this invention, the adhesive means 34 comprises a cyanoacrylate ester, such as a super glue sold under the trade name Loctite-454, and the spot 33 of adhesive means 34 was placed on the band 27 of the toggle opened clamping means 24 to define an amount that is approximately one quarter of an inch in diameter. Thus, when the hose 21 was placed against such spot 33, the adhesive means 34 was found to spread out in a circumferential direction on the band 27 of the clamping means 24 to create an area of approximately three-quarters of an inch long and which substantially extends throughout the entire width of the band 27 of the clamping means 24 so as to provide a sufficient area of adhesion that will not cause deforming of the hose 21 yet securely fasten the clamping means 24 thereto so that the same can be utilized for clamping the end 22 onto a suitable member, such as the member 31 illustrated in FIGS. 2–5.

Figure 2:
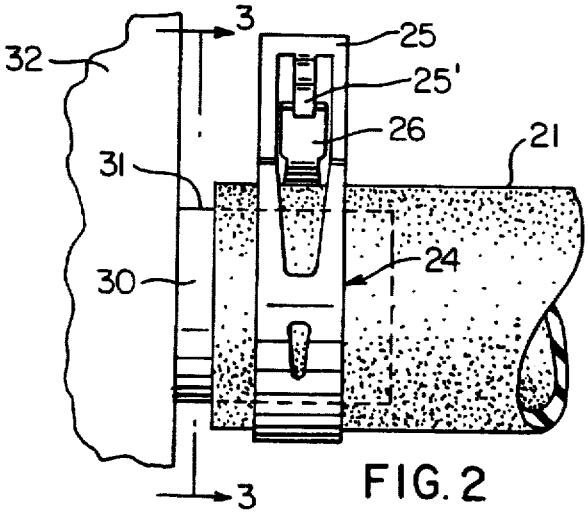
FIG. 2 is a fragmentary side view illustrating the hose construction of FIG. 1 being initially assembled on a tubular member of a coolant structure of an internal combustion engine.

In particular, after the clamping means 24 has been secured on the flexible hose 21 in the manner previously set forth and is in the toggled open condition thereof, the end 22 of the hose 21 can be inserted onto the member 31 of the coolant structure 32 in the manner illustrated in FIGS. 2 and 3 and thereafter the end projections 25 and 26 of the clamping means 24 can be released from each other to cause the natural resiliency of the clamping means 24 to circumferentially move apart the end projections 25 and 26 from each other whereby the band means 27 circumferentially shrinks into its clamping condition as illustrated in FIGS. 4 and 5 to seal the end 22 of the hose construction 20 onto the member 30 of the coolant structure 32 until it is desired to subsequently remove the hose construction 20 therefrom by merely moving the projecting end portions 25 and 26 toward each other in the manner illustrated in FIGS. 2 and 3 so as to circumferentially enlarge the clamping means 24 so that the end 22 of the hose 21 can be slipped off of the member 30 for any desired purpose, such as for replacing the radiator hose construction or the like.

While the pressure being applied between the hose end 22 and the clamping means 24 during the setting of the adhesive means 34 as previously set forth for securing the clamping means 24 to the hose 21 can be applied in any suitable manner, it is to be understood that the clamping means 24 itself could apply such force by untoggling the projecting ends 25 and 26 from each other after the hose 21 has been telescoped into the open clamping means 24 in the manner illustrated in FIG. 9 so that the natural spring force of the clamping means 24 itself will compress the hose end 22 against the adhesive means 34 between the hose 21 and the clamping means 24. If desired, a suitable mandrel could be first inserted into the hose 21 before the clamping means 24 is released to its clamping condition for such purpose. Thereafter, the mandrel could be removed from the hose 21 and the clamping means 24 could be toggled to its open condition for subsequent storing and shipping of the resulting hose construction 20 until it is desired to utilize the hose construction 20 for its intended purpose.

In the one working embodiment of this invention previously set forth, the clamping means 24 has a toggle open diameter 28 of approximately 65 millimeters.

Therefore, it can be seen that this invention not only provides a new hose construction, but also this invention provides a new method of making such a hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a hose construction comprising a tubular flexible hose having opposite ends, fastening means, and a clamping means fastened to one of said ends of said hose with said fastening means for substantially circumferentially and radially inwardly clamping said one end onto a member that has been inserted into said one end, said clamping means having end projections for being toggled together to circumferentially enlarge said clamping means and hold said clamping means out of its clamping condition and for being released from each other so as to be circumferentially moved apart from each other as said clamping means circumferentially shrinks into its said clamping condition by the natural spring force of said clamping means, the improvement comprising the steps of forming said fastening means to comprise a single spot of adhesive means disposed between and against said clamping means and said hose at a point on said hose that is located substantially diametrically opposite the point on said hose where said end projections of said clamping means are adapted to be toggled together, forming said adhesive means to initially comprise a spot disposed on one of said clamping means and said hose before said clamping means and said hose are assembled together, then assembling said hose and said clamping means together while said end projections of said clamping means are toggled together, and then placing said hose and said clamping means under pressure at said spot of adhesive means during the time said adhesive means sets [by releasing said end projections of said clamping means from said toggled condition thereof].

2. A method as set forth in claim 1 and including the step of forming said adhesive means to comprise as cyanoacrylate ester.

3. A method as set forth in claim 1 and including the step of forming said spot to be approximately one-fourth of an inch in diameter before said clamping means and said hose are assembled together.

4. A method as set forth in claim 3 and including the step of causing said spot to spread out to about three-fourths of an inch long in circumferential direction when said clamping means and said hose are assembled together.

5. A method as set forth in claim 4 and including the step of causing said spot to also spread out to about the width of said clamping means in a direction transverse to said circumferential direction when said clamping means and said hose are assembled together.

* * * * *